United States Patent
Clark et al.

(10) Patent No.: US 10,528,092 B2
(45) Date of Patent: Jan. 7, 2020

(54) MIDPLANE ANTI-CODOCKING INTERLOCK SYSTEM

(71) Applicant: International Business Machines Corporation, Armonk, NY (US)

(72) Inventors: Mark G. Clark, Rochester, MN (US); Kenneth E. Lubahn, Oronoco, MN (US); Justin C. Rogers, Rochester, MN (US); Sandra J. Shirk/Heath, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/480,104

(22) Filed: Apr. 5, 2017

(65) Prior Publication Data
US 2018/0292869 A1  Oct. 11, 2018

(51) Int. Cl.
A47B 81/00 (2006.01)
G06F 1/18 (2006.01)

(52) U.S. Cl.
CPC .............. *G06F 1/183* (2013.01); *G06F 1/185* (2013.01)

(58) Field of Classification Search
CPC ........ H05K 7/1461; G06F 1/183; G06F 1/185
USPC ............................ 312/223.1, 223.2; 361/759
See application file for complete search history.

(56) References Cited

U.S. PATENT DOCUMENTS

| | | | |
|---|---|---|---|
| 5,265,328 A * | 11/1993 | Gorman | H01R 43/26 29/278 |
| 5,422,785 A * | 6/1995 | Garrett | G06F 1/183 361/679.32 |
| 5,644,470 A | 7/1997 | Benedict et al. | |
| 6,169,662 B1 | 1/2001 | Clark et al. | |
| 6,411,517 B1 | 6/2002 | Babin | |
| 6,687,134 B2 * | 2/2004 | Vinson | G06F 1/184 211/41.17 |
| 7,539,026 B2 | 5/2009 | Finnerty et al. | |
| 7,654,844 B1 * | 2/2010 | Wormsbecher | H01R 13/62938 361/727 |
| 8,009,440 B2 * | 8/2011 | Desrosiers | H05K 7/1409 361/737 |
| 9,274,548 B2 | 3/2016 | Foisy et al. | |

(Continued)

OTHER PUBLICATIONS

Anonymously "A Compact Integrated Circuit Card Keying, Retention, and Immobilizer Methodology for Circuit Cards," Oct. 24, 2013.

(Continued)

*Primary Examiner* — Matthew W Ing
(74) *Attorney, Agent, or Firm* — Patterson + Sheridan, LLP

(57) ABSTRACT

A system includes a system drawer and an interlock coupled to the system drawer. The interlock includes a horizontal portion and a tab. The interlock is configured to rotate into a first position when a first card is inserted into a first side of the system drawer. When the interlock is in the first position, the tab prevents a second card inserted into the second side of the system drawer from docking with the first card. The interlock is further configured to rotate into a second position when the first card is removed from the first side of the system drawer. When the interlock is in the second position, the second card can be inserted into the second side of the system drawer to a position where the second card can dock with one or more cards inserted into the first side of the system drawer.

16 Claims, 7 Drawing Sheets

(56) References Cited

U.S. PATENT DOCUMENTS

| | | | |
|---|---|---|---|
| 9,362,637 B2 | 6/2016 | Hasegawa | |
| 2006/0087801 A1* | 4/2006 | Champion | G06F 1/185 361/679.41 |
| 2006/0150403 A1* | 7/2006 | Haager | H05K 7/1461 29/830 |
| 2013/0003327 A1* | 1/2013 | Saito | H05K 7/1461 361/756 |
| 2013/0250525 A1* | 9/2013 | Wang | H05K 7/1461 361/737 |
| 2014/0002971 A1* | 1/2014 | Chung | H05K 5/0286 361/679.01 |
| 2015/0201518 A1* | 7/2015 | Hsu | H05K 7/1461 361/807 |
| 2017/0280579 A1* | 9/2017 | Tan | H01R 24/62 |

OTHER PUBLICATIONS

Anonymously, "Compact Integrated Computer System Planar Assembly Assist to Prevent Backside Component Damage," Aug. 15, 2013.

* cited by examiner

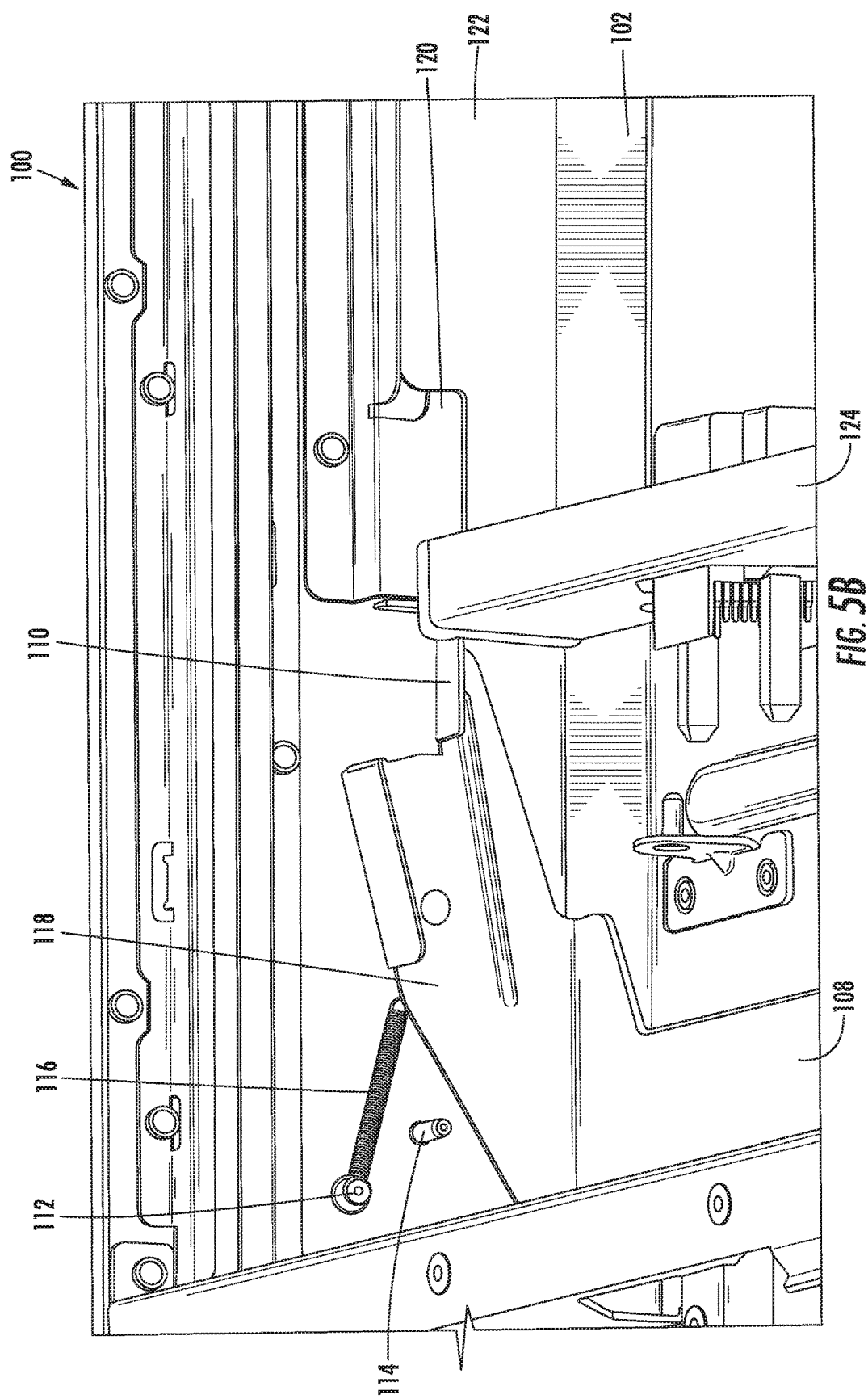

MIDPLANE ANTI-CODOCKING INTERLOCK SYSTEM

BACKGROUND

The present invention relates to computer systems, and more specifically, to an interlock system to reduce connector damage.

In computer systems utilizing system drawers mounted in a rack, circuit card assemblies are used to provide various functionalities. Circuit card assemblies may be added, removed, or replaced for a variety of reasons, such as to add functionality or to remove a faulty component. These circuit card assemblies may have multiple connectors of varying styles that connect to other cards or components within the system drawer. When a card assembly is inserted into a system drawer, one or more connectors on the card assembly plug into another component. This other component may be a card assembly that has been inserted into the opposite side of the rack. The user or serviceperson inserting and/or removing the card assemblies needs to insert or remove the assemblies correctly; i.e., in the correct sequence. If the sequence is incorrect, the card assemblies may suffer broken pins, bent pins, and other damage to the connectors.

SUMMARY

According to one embodiment of the present invention, a method includes rotating an interlock into a first position when a first card is inserted into a first side of a system drawer. When the interlock is in the first position, a tab on the interlock prevents a second card inserted into the second side of the system drawer from docking with the first card. The interlock is coupled to the system drawer. The method also comprises rotating the interlock into a second position when the first card is removed from the first side of the system drawer. When the interlock is in the second position, the second card can be inserted into the second side of the system drawer to a position where the second card can dock with one or more cards inserted into the first side of the system drawer.

According to another embodiment, a system includes a system drawer and an interlock coupled to the system drawer. The interlock includes a horizontal portion and a tab. The interlock is configured to rotate into a first position when a first card is inserted into a first side of the system drawer. When the interlock is in the first position, the tab prevents a second card inserted into the second side of the system drawer from docking with the first card. The interlock is further configured to rotate into a second position when the first card is removed from the first side of the system drawer. When the interlock is in the second position, the second card can be inserted into the second side of the system drawer to a position where the second card can dock with one or more cards inserted into the first side of the system drawer.

BRIEF DESCRIPTION OF THE SEVERAL VIEWS OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIGS. 5A and 5B illustrate a system drawer that comprises an interlock in a second position according to an embodiment.

DETAILED DESCRIPTION

Embodiments described herein disclose techniques for reducing or preventing damage to one or more connectors on a card assembly. In the embodiments described below, an interlock mechanism in the system drawer prevents any user from plugging or unplugging components in the wrong sequence. This reduces the probability of damaged connectors. In addition, the interlock operates without requiring complicated instructions or training of the end user or serviceperson.

Figure 1:
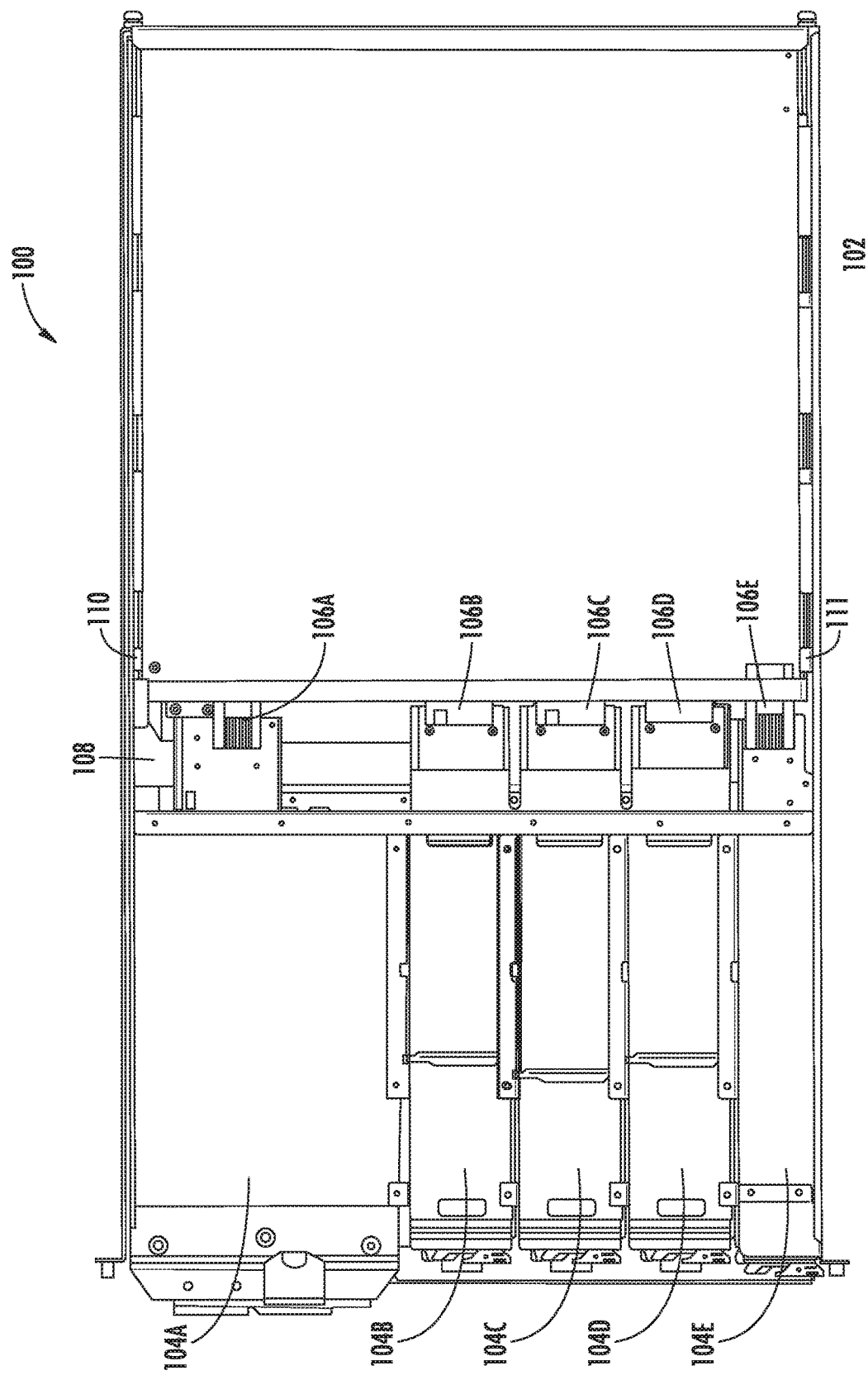
FIG. 1 illustrates a system drawer that comprises an interlock in accordance with an embodiment herein.

FIG. 1 illustrates a system drawer 100 that comprises an interlock in accordance with embodiments herein. FIG. 1 is a top view of the system drawer 100, with the top of the drawer 100 removed so that the components inside the drawer 100 can be viewed. A number of card assemblies are illustrated in this view of system drawer 100. A main assembly 102 is a card that is inserted into the right side of the system drawer 100. In embodiments herein, this right side of the system drawer 100 is also referred to as the second side of the system drawer 100. Main assembly 102 includes a number of connectors of varying styles that connect to other components.

Other cards are inserted into the left side of system drawer 100 and are denoted as cards 104A-104E. The left side of system drawer 100 is also referred to as the first side of system drawer 100. Each of these cards 104 has a connector 106 that connects to a corresponding connector on main assembly 102. For example, card 104A includes connector 106A as illustrated, card 104B includes connector 106B, and so on for cards 104C-104E. The connectors 106A-106E connect to main assembly 102 via one or more pins. The connectors must be aligned property to prevent damage to the pins. In addition, when main assembly 102 needs to be removed from system drawer 100 for service or replacement, the force applied to main assembly 102 to remove main assembly 102 may damage the connectors 106A-106E. Furthermore, if any of the cards 104A-104E are inserted into system drawer 100 before main assembly 102 is inserted, the insertion of main assembly 102 into system drawer 100 may damage the connectors 106A-106E.

The specific card assemblies 102 and 104 shown in the figures herein are for illustrative purposes only. Any suitable type of card assemblies may be used. The various cables, circuitry, connector types, etc., may differ in other embodiments. In addition, any number of card assemblies may be used on either side of system drawer 100. Various components of the system drawer 100 are also illustrated, such as rails, posts, stops, etc. These types of components may vary in other embodiments. Any other suitable type or structure of system drawer 100 may be used in other embodiments.

System drawer 100 further comprises interlock 108. Interlock 108, in this example embodiment, is a component coupled to system drawer 100 that prevents the main assembly 102 and the cards 104A-104E from being inserted or removed in the wrong sequence. Interlock 108 may comprise another size or another structure in another embodiment. For example, interlock 108 spans the entire width of the interior of system drawer 100 in this example. In another embodiment, interlock 108 may only span part of the width of system drawer 100. The operation of interlock 108 is described in further detail below.

Interlock 108 further comprises tabs 110 and 111, illustrated in FIG. 1. When interlock 108 is a in a first position, tabs 110 and 111 operate to prevent main assembly 102 from being inserted fully into system drawer 100. That is, an edge of main assembly 102 will come into contact with tabs 110 and 111 when interlock 108 is in the first position, and that contact will prevent main assembly 102 from full insertion into system drawer 100. Interlock 108 is in the first position when at least one of cards 104A-104E is inserted into system drawer 100. In addition, when interlock 108 is in the first position and there is no main assembly 102 inserted into the system drawer 100, tabs 110 and 111 prevent main assembly 102 from being fully inserted into system drawer 100. Therefore, when at least one card 104 is in system drawer 100, main assembly 102 can be neither removed nor inserted. The interlock provides this restriction to prevent damage to the connectors 106 caused by codocking the main assembly 102 (codocking refers to attempting to dock multiple connectors at once).

When none of cards 104A-104E are inserted into system drawer 100, interlock 108 is in a second position. In the second position, tabs 110 and 111 are moved out of the way of main assembly 102, and main assembly 102 can be either inserted or removed from system drawer 100. Therefore, interlock 108 prevents a user or serviceperson from removing or inserting card assemblies out of order. In this example embodiment, the correct order requires that the main assembly 102 must be inserted before any card 104, and the main assembly 102 can only be removed after all cards 104 have been removed.

In this embodiment, interlock 108 comprises two tabs, 110 and 111. In other embodiments, interlock 108 may only have one tab, or may have more than two tabs.

A number of issues can occur in a system without interlock 108 that can increase the chances of damaging one or more connectors 106. For example, the connections between main assembly 102 and cards 104 are generally in a location that is blind to the user. That is, main assembly 102 docks with cards 104 using connectors 106 in the middle of the system drawer 100. The system drawer 100 has a top and bottom cover, and is often situated in a rack with other system drawers both above and below it. Therefore, a user that is inserting or removing a main assembly 102 or a card 104 cannot see the connectors 106. If the system drawer 100 is mounted in a rack that is situated alongside a long row of racks, the user would have to walk around the row of racks to the other side of the system drawers to see if any of cards 104 are inserted into system drawer 100. With interlock 108, a user will be unable to fully insert main assembly 102 into system drawer 100 when any card 104 is already present inside system drawer 100. The user does not have to move around to the back side of the rack and visibly check if cards 104 are already inserted. Instead, if main assembly 102 will not insert, the user knows that cards 104 are present within system drawer 100. Preventing main assembly 102 from docking in this scenario reduces the chances of damaging connectors 106. If main assembly 102 does insert fully into the system drawer 100, then the user knows that no cards 104 are inserted into the system drawer 100, and it is acceptable to insert the main assembly 102.

In systems without interlock 108, instructions may be used to educate a user about the proper sequence of inserting and removing components into system drawer 100. However, written or oral instructions can create a number of problems. First, the instructions need to be clearly written or delivered, without ambiguity. Second, the instructions need to be either communicated to the user in advance (i.e., in-person training) or printed somewhere on a card assembly, rack, or system drawer where the user will see it. In-person training may not be cost effective, and would need to be repeated for each new user. Third, the printed instructions need to be in the appropriate language. Computer systems today are sold and installed around the world, and therefore the user may speak any of dozens of languages. It may be impractical to provide instructions in every language that a user may potentially speak. In addition, translating the instructions into another language introduces the possibility of a translation error or miscommunication. With interlock 108, no instructions are needed to ensure the appropriate sequence of removing and inserting circuit card assemblies. The interlock 108 provides a physical mechanism that requires the proper sequence reduces the chances of damage to the circuit card assemblies.

Figure 2:
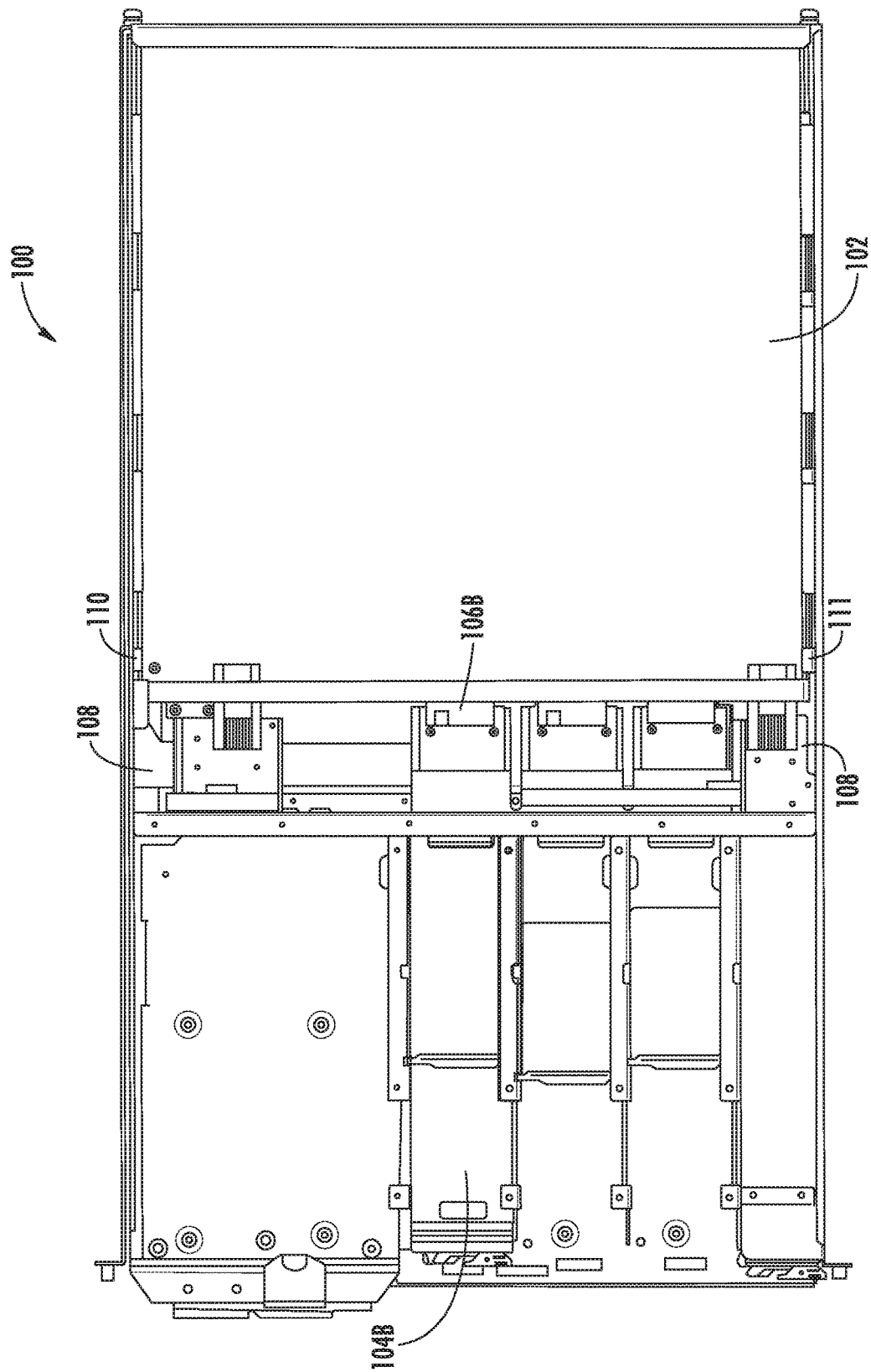
FIG. 2 illustrates another view of a system drawer that comprises an interlock according to an embodiment.

FIG. 2 is another view of system drawer 100 with all but one of the cards 104 removed. That is, card 104B and connector 106B are installed in system 100, but the other cards 104 have been removed. Main assembly 102 is also shown inserted into system drawer 100. In this view of system drawer 100, the entire length of interlock 108 can be seen. Interlock 108 spans the width of system drawer 100 in this embodiment. Tabs 110 and 111 are also illustrated in FIG. 2.

In the embodiment illustrated in FIG. 2, main assembly 102 has been inserted, so other cards 104 can be inserted and can dock with main assembly 102. If the user wanted to remove main assembly 102, each card 104 would first need to be removed. With interlock 108 in this first position, tabs 110 and 111 are situated within notches that are located in the edges of main assembly 102. These notches are illustrated and described in further detail below. When interlock 108 is in the first position and tabs 110 and 111 are situated within the notches, main assembly 102 cannot be removed from the system drawer 100.

Figure 3A:
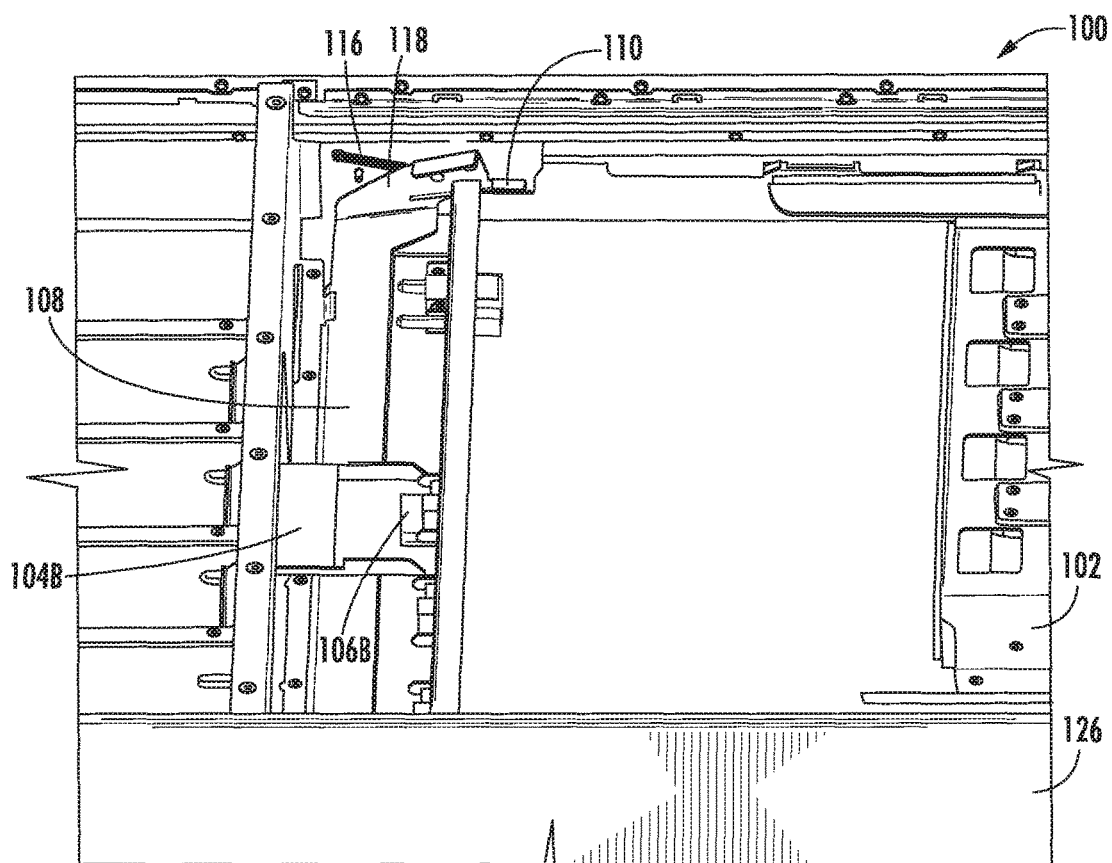
FIGS. 3A and 3B illustrate a system drawer that comprises an interlock in a first position according to an embodiment.
Figure 3B:
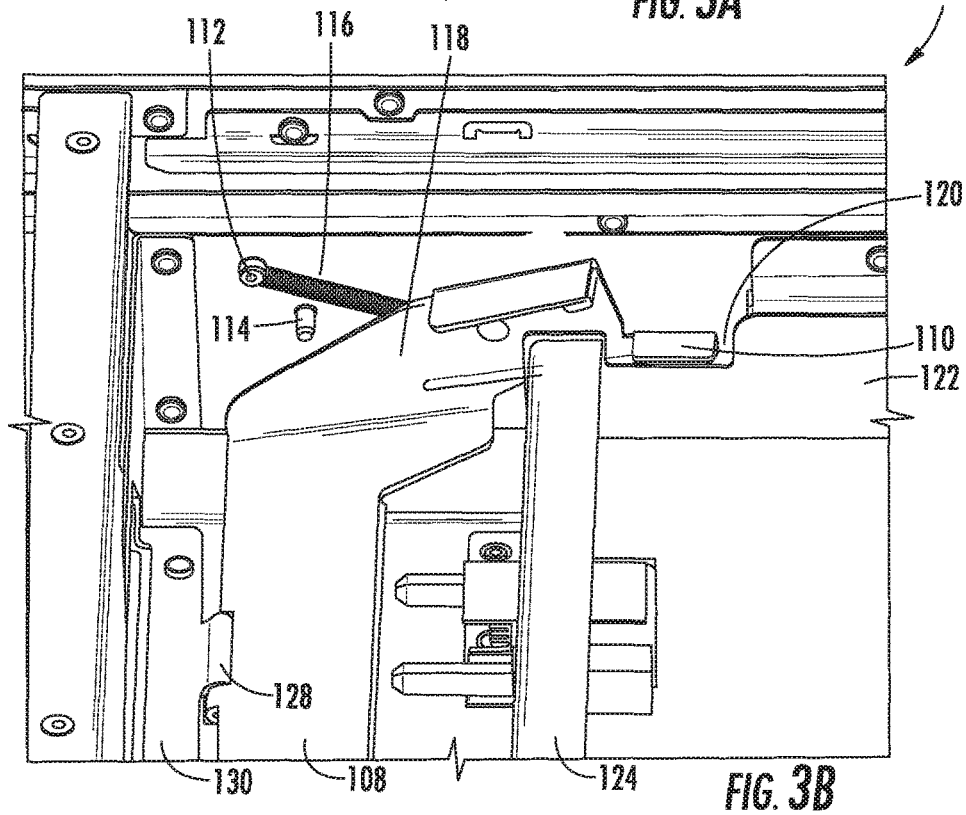

FIGS. 3A and 3B illustrate another view of system drawer 100 according to an embodiment. FIG. 3B is a zoomed-in view of FIG. 3A. In FIG. 3A, main assembly 102 is inserted into system drawer 100. A side 126 of system drawer 100 is also illustrated. In addition, card 104B is inserted and connector 106B is docked to main assembly 102. Because card 104B is inserted, interlock 108 has been rotated into the first position. Card 104B rests on top of a horizontal portion of interlock 108 and rotates interlock 108 into the first position. In this figure, the interlock 108 rotates clockwise when card 104B is inserted. When interlock 108 is in the first position, the vertical portion 118 of interlock 108 is also rotated forward and tab 110 moves down, where it interacts with main assembly 102.

FIG. 3B illustrates a closeup view of interlock 108 in system drawer 100. In this view, card 104B is inserted (not visible in FIG. 3B) and interlock 108 is rotated into the first position. A retainer 130 holds one or more pivot points 128 for the interlock 108. These pivot points 128 allow interlock 108 to rotate between the first and second positions. One end of a spring 116 is coupled to interlock 108, specifically to the vertical portion 118 of interlock 108 in this example. The spring 116 could be coupled elsewhere to interlock 108 in other embodiments. The other end of spring 116 is coupled to the system drawer 100 via a post 112. In some embodiments, another spring 116 is attached to the other end of interlock 108 (not illustrated). In other embodiments, any number of springs may be used.

Stop 114 is also illustrated in FIG. 3B. Stop 114 provides a stop for interlock 108 when interlock 108 is rotated up into the second position. The second position will be illustrated in further detail below. Further illustrated in FIG. 3B is tab 110. Tab 110 inserts into a notch 120 of side 122 of main assembly 102. When interlock 108 is in the first position as shown, tab 110 prevents main assembly 102 from being removed from system drawer 100. If a user attempts to remove main assembly 102 (by pulling main assembly 102 towards the right side of the figure), tab 110 hits front 124 of main assembly 102 and prevents removal. Therefore, to remove main assembly 102, interlock 108 must be rotated up into the second position so that tab 110 is no longer situated within notch 120. Interlock 108 is rotated up by removing all of the cards 104 from the left side of system drawer 100. Therefore, the interlock 108 prevents main assembly 102 from being forcibly removed while connected to one or more cards 104, thereby preventing damage to the connectors on cards 104.

Figure 4A:
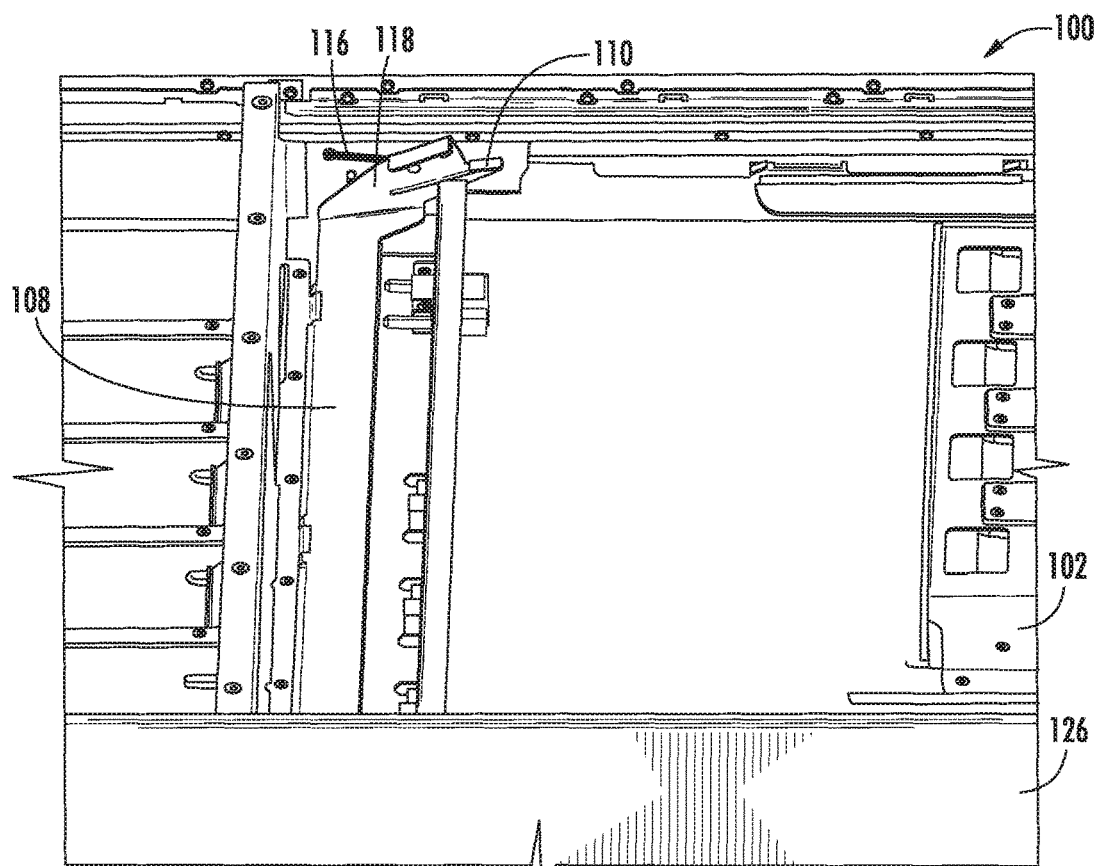
FIGS. 4A and 4B illustrate a system drawer that comprises an interlock in a second position according to an embodiment.
Figure 4B:
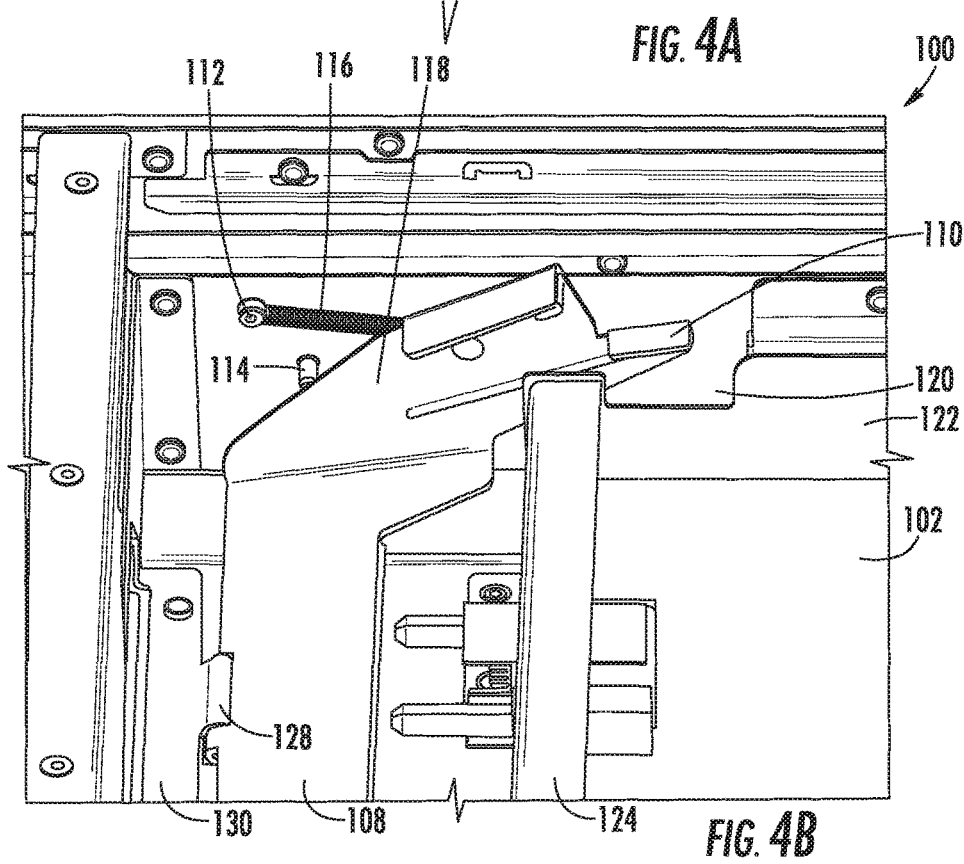

FIGS. 4A and 4B illustrate another view of interlock 108 in system drawer 100. In these figures, all of the cards 104 have been removed from system drawer 100. With the cards 104 removed, there is no force on the horizontal portion of interlock 108 that moves the interlock 108 into the first position. Therefore, the tension on spring 116 pulls interlock 108 up, and the vertical portion 118 and tab 110 of interlock 108 are also pulled up. Tab 110 is therefore clear of notch 120. With tab 110 clear of notch 120, main assembly 102 can be removed without tab 110 stopping the removal. Therefore, once all cards 104 have been removed (or at least have been moved far enough to the left that they are clear of interlock 108), main assembly 102 can be removed.

FIG. 4B illustrates a closeup view of interlock 108 in system drawer 100. Interlock 108 is in the second (up) position. As seen in this view, tension in spring 116 has moved tab 110 out of notch 120. Retainer 130 holds one or more pivot points 128 that allow interlock 108 to rotate up into the second position. The vertical portion 118 of interlock 108 touches stop 114, which prevents interlock 108 from rotating further in the counterclockwise direction. When a card 104 is re-inserted from the left side of system drawer 100, interlock 108 will once again rotate down into the first position.

With tab 110 out of notch 120 in this example, main assembly 102 can be removed or inserted without being obstructed by tab 110. Tab 110 clears side 122 and front 124 of main assembly 102. Therefore, a user can freely insert or remove main assembly 102 once all cards 104 have been removed. The user does not need to visibly verify that the cards 104 have been removed. If tab 110 is in the up position, no cards 104 are fully inserted into system drawer 100 and codocking damage will not occur by inserting or removing main assembly 102.

Figure 5A:
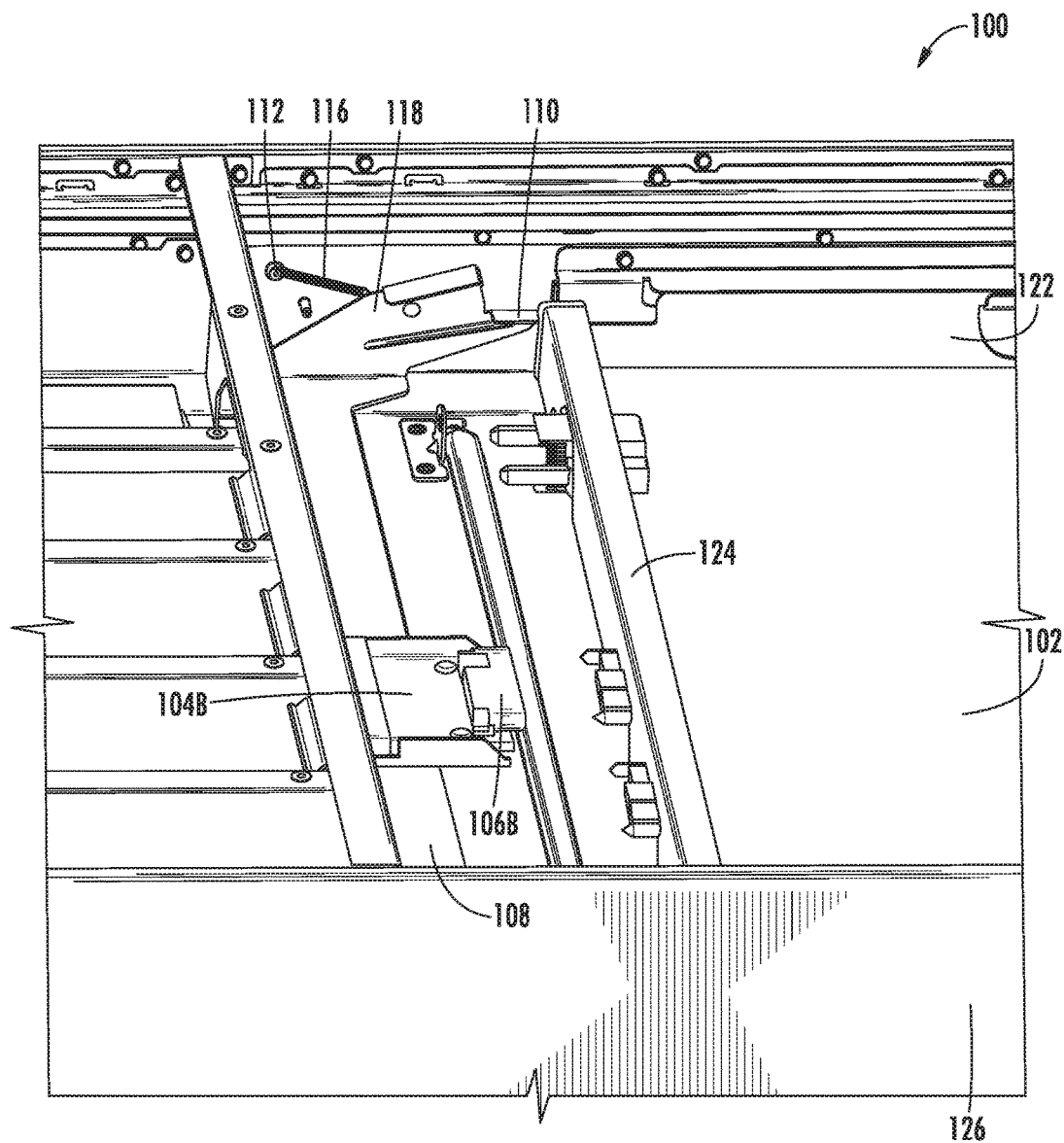

FIGS. 5A and 5B illustrate another view of interlock 108 in system drawer 100. In this example, a card 104B is inserted into system drawer 100 before main assembly 102 is inserted. These figures illustrate the second function of interlock 108. The first function of interlock 108 is to prevent main assembly 102 from being inserted until all cards 104 have been removed, as illustrated in FIGS. 4A and 4B. The second function of interlock 108 is to prevent main assembly 102 from being inserted while one or more cards 104 are inserted into system drawer 100. As shown in FIG. 5A, card 104B rests on top of interlock 108 and therefore rotates interlock 108 into the first position. With interlock 108 in the first position, tab 110 prevents main assembly 102 from being fully inserted into system drawer 100. In this position, the corner of main assembly 102 (where side 122 and front 124 meet) hits tab 110 and main assembly 102 is prevented from being inserted further. Card 104 needs to be removed before main assembly 102 can be inserted. Interlock 108 therefore prevents damage to any connectors 106 caused by attempting to co-dock multiple cards 104 with main assembly 102. In addition, as described above, interlock 108 prevents the insertion of main assembly 102 without requiring instructions provided to the user. Instead, main assembly 102 is physically prevented from being inserted until cards 104 are safely out of the way.

FIG. 5B illustrates a closeup view of interlock 108 in the first position. Although not visible, a card 104 is inserted into system drawer 100. Card 104 rests on interlock 108 and rotates interlock 108 (clockwise) into the first position. In this position, tab 110 makes contact with main assembly 102 and prevents main assembly 102 from docking with any cards 104 that are inserted into system drawer 100. The user or serviceperson would have to remove cards 104 before main assembly 102 can be inserted. Spring 116 (coupled to post 112 and vertical portion 118) is under tension, but the placement of card 104 on top of interlock 108 keeps interlock 108 rotated down into the first position. This figure shows a larger view of the corner of main assembly 102 (where side 122 and front 124 meet) contacting tab 110, which prevents main assembly 102 from being inserted further into system drawer 100.

Figure 6:
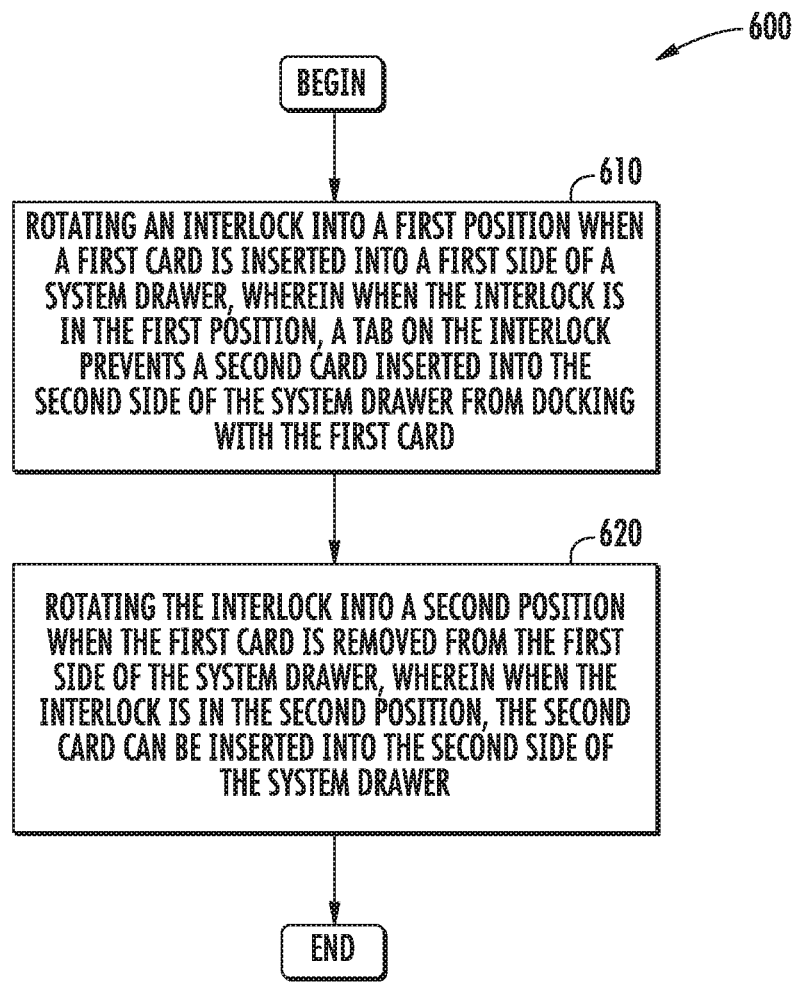
FIG. 6 is a flow diagram of method steps for preventing codocking damage in a system drawer, according to one embodiment described herein.

FIG. 6 is a flow diagram of method steps 600 for preventing codocking damage in a system drawer, according to one embodiment of the present invention. Although the method steps are described in conjunction with FIGS. 1-5 above, persons skilled in the art will understand that any system configured to perform the method steps, in any order, falls within the scope of the present invention. In various embodiments, the hardware and/or software elements described above in FIGS. 1-5 can be configured to perform the method steps of FIG. 6.

A method 600 begins at step 610, where an interlock, coupled to a system drawer, is rotated into a first position when a first card is inserted into a first side of a system drawer. When the interlock is in the first position, the tab prevents a second card inserted into the second side of the system drawer from docking with the first card.

The method proceeds to step 620, where the interlock is rotated into a second position when the first card is removed from the first side of the system drawer. When the interlock is in the second position, the second card can be inserted into the second side of the system drawer to a position where the second card can dock with one or more cards inserted into the first side of the system drawer.

In some embodiments, the tab is coupled to a vertical portion of the interlock. In another embodiment, a spring holds the interlock into the second position when the first card is removed from the first side of the system drawer.

As described above, embodiments of the interlock system herein can help reduce or prevent connector damage. The interlock system physically prevents a main assembly from being inserted when one or more card assemblies are already inserted into the other side of the system drawer. Therefore, a user or serviceperson would not need to move to the other side of the rackmount system to check if card assemblies are inserted, and would not need to look into the system drawer to see if card assemblies are inserted, which can be difficult if the system drawer is surrounded by other system drawers. The interlock provides this information to the user by preventing or allowing the main assembly to be fully inserted.

The interlock system described herein also prevents a user or serviceperson from damaging the connectors by inserting assemblies in the wrong order. The interlock system does this without relying on written instructions for the user. If the user attempts to insert or remove the main assembly without clearing all of the other card assemblies, the interlock prevents the main assembly from being inserted or removed.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method comprising:
    rotating an interlock into a first position when a first card is inserted into a first side of a system drawer, wherein when the interlock is in the first position, a tab on the interlock prevents a second card inserted into a second side of the system drawer from docking with the first card, wherein the interlock is coupled to the system drawer; and
    rotating the interlock into a second position when the first card is removed from the first side of the system drawer, wherein when the interlock is in the second position, the second card can be inserted into the second side of the system drawer to a position where the second card can dock with one or more cards inserted into the first side of the system drawer.

2. The method of claim 1, further comprising:
    preventing, with the tab, the second card on the second side of the system drawer from being removed from the system drawer when the interlock is in the first position.

3. The method of claim 1, wherein the tab is coupled to a vertical portion of the interlock.

4. The method of claim 1, further comprising:
    holding the interlock, with a spring, into the second position when the first card is removed from the first side of the system drawer.

5. The method of claim 4, wherein the interlock is held into the second position with multiple springs.

6. The method of claim 1, wherein multiple cards are inserted into the first side of the system drawer, and any one of the multiple cards rotates the interlock into the first position when inserted into the first side of the system drawer.

7. The method of claim 1, wherein when the first card is inserted into the first side of the system drawer, the first card contacts a horizontal portion of the interlock.

8. The method of claim 1, wherein the tab prevents the second card inserted into the second side of the system drawer from docking with the first card by blocking the second card from being fully inserted into the system drawer.

9. A system, comprising:
    a system drawer; and
    an interlock coupled to the system drawer, wherein the interlock comprises a horizontal portion and a tab, and wherein the interlock is configured to:
        rotate into a first position when a first card is inserted into a first side of the system drawer, wherein when the interlock is in the first position, the tab prevents a second card inserted into a second side of the system drawer from docking with the first card; and
        rotate into a second position when the first card is removed from the first side of the system drawer, wherein when the interlock is in the second position, the second card can be inserted into the second side of the system drawer to a position where the second card can dock with one or more cards inserted into the first side of the system drawer.

10. The system of claim 9, wherein when the interlock is in the first position, the tab prevents the second card on the second side of the system drawer from being removed from the system drawer.

11. They system of claim 10, wherein the tab prevents the second card from being removed by inserting into a notch in the second card.

12. The system of claim 9, wherein the tab is coupled to a vertical portion of the interlock.

13. The system of claim 9, wherein a spring holds the interlock into the second position when the first card is removed from the first side of the system drawer.

14. The system of claim 9, wherein multiple cards may be inserted into the first side of the system drawer, and any one of the multiple cards will rotate the interlock into the first position when inserted into the first side of the system drawer.

15. The system of claim 9, wherein contact between the first card and the horizontal portion of the interlock rotates the interlock into the first position when the first card is inserted into the first side of the system drawer.

16. The system of claim 9, wherein the tab prevents the second card inserted into the second side of the system drawer from docking with the first card by blocking the second card from being fully inserted into the system drawer.

* * * * *